(12) United States Patent
Li

(10) Patent No.: US 7,562,667 B2
(45) Date of Patent: *Jul. 21, 2009

(54) OUTDOOR UMBRELLA WITH SOLAR POWER SUPPLY

(76) Inventor: Wanda Ying Li, 121 E. Alton, Santa Ana, CA (US) 92707

(*) Notice: Subject to any disclaimer, the term of this patent is extended or adjusted under 35 U.S.C. 154(b) by 247 days.

This patent is subject to a terminal disclaimer.

(21) Appl. No.: 11/325,058

(22) Filed: Jan. 3, 2006

(65) Prior Publication Data

US 2008/0006312 A1    Jan. 10, 2008

Related U.S. Application Data

(62) Division of application No. 11/059,186, filed on Feb. 15, 2005, now Pat. No. 7,013,903.

(51) Int. Cl.
*A45B 3/02* (2006.01)
*A45B 11/00* (2006.01)

(52) U.S. Cl. ............ 135/21; 135/910; 135/31; 362/102

(58) Field of Classification Search .......... 135/16, 135/20.1, 21, 910; 362/102
See application file for complete search history.

(56) References Cited

U.S. PATENT DOCUMENTS

| 5,116,258 | A  | * | 5/1992  | Vennik   | 135/20.3 |
| 6,017,188 | A  | * | 1/2000  | Benton   | 416/5    |
| 6,169,242 | B1 | * | 1/2001  | Fay et al. | 84/609 |
| 6,439,249 | B1 | * | 8/2002  | Pan et al. | 135/16 |
| 6,612,713 | B1 | * | 9/2003  | Kuelbs   | 362/102  |
| 6,666,224 | B2 | * | 12/2003 | Lee      | 135/16   |

* cited by examiner

*Primary Examiner*—David Dunn
*Assistant Examiner*—Danielle Jackson
(74) *Attorney, Agent, or Firm*—Raymond Y. Chan; David and Raymond Patent Firm

(57) ABSTRACT

An outdoor umbrella includes a foldable umbrella awning, an umbrella frame, a lighting system mounted on the umbrella frame, and a solar power supply arrangement which converts solar energy into electrical energy and provides the converted electrical energy to the lighting system for lighting up the lighting system. The solar power supply arrangement includes a solar collecting device supported by the main supporting stem, wherein the solar collecting device has a collecting surface arranged to expose to sunlight for extensively collecting solar energy.

8 Claims, 8 Drawing Sheets

OUTDOOR UMBRELLA WITH SOLAR POWER SUPPLY

CROSS REFERENCE OF RELATED APPLICATION

This is a Divisional application of a non-provisional application having an application Ser. No. 11/059,186 and a filing data of Feb. 15, 2005 now U.S. Pat. No. 7,013,903.

BACKGROUND OF THE PRESENT INVENTION

1. Field of Invention

The present invention relates to an umbrella, and more particularly to an outdoor umbrella with solar power supply which converts solar energy to electrical energy and provides the electrical energy to electrical appliances attached on the umbrella, such as an illumination system.

2. Description of Related Arts

Foldable outdoors umbrellas are set up in many places such as in beach areas, in patio areas, in campsites or in domestic gardens etc. They are usually used for shading sunlight in the daytime. A conventional outdoors umbrella usually comprises an umbrella base, a supporting stem upwardly extended therefrom, a foldable awning frame which comprises a plurality of awning supporting arms radically and outwardly extended from an upper end portion of the supporting stem, and a fabric-made awning securely and foldably mounted on the awning supporting arms. There are few outdoors umbrella that has a lighting device mounted thereon. As a consequence, during nighttime, a user of the umbrella may either mount a lighting device, such as a portable lamp onto the supporting stem of the umbrella, or simply put the lighting device on the ground in which the umbrella stands for illumination.

Actually, mounting a lighting system on the outdoors umbrella is a challenging task. Not to mention the problems arise when one tries to design the mechanical connection between the lighting system and the outdoors umbrella without interfering its smooth folding action, it is the problem as how to provide the lighting system with enough and convenient power source which simply possesses the main difficulty in designing a practical lighting system.

As a matter of fact, some outdoors umbrellas with lighting systems are developed. Almost all of these existing outdoors umbrellas utilize conventional electrical power source to activate their lighting system. In other words, for each of these outdoors umbrellas, a power plug is extended from the lighting system via electrical wires and arranged to plug into an external electrical power source.

Since the outdoors umbrellas, as the name implies, are designed for use in outdoors, existence of an electrical power source cannot be guaranteed. Even through there are electrical sources exist, a tedious connection between the lighting system and the electrical source is unavoidable in that long wires have to be used. For some cases, the lighting systems may be compatible with portable dynamos, however, bring a bulky dynamo with the outdoor umbrella is not really a wise decision. For some other cases, instead of using dynamos, portable rechargeable batteries are used. However, the batteries may run out fast and the users of the outdoors umbrellas have to recharge the batteries frequently. If the users want to use the umbrella for overnight camping or picnic but he/she forgets recharging the battery, the lighting system cannot work and the mood of all the participants may be ruined.

As a matter of fact, the very purpose of using outdoors umbrella is to shade vigorous sunlight. Therefore, it would be more economical, more convenient and more environmentally friendly if one were able to utilize solar energy and convert it into electrical energy for providing power to the lighting system of the outdoor umbrella.

SUMMARY OF THE PRESENT INVENTION

A main object of the present invention is to provide an outdoors umbrella which comprises a solar power supply arrangement and a lighting system, wherein the solar energy supply arrangement is adapted to convert solar energy into electrical energy so as to activate the lighting system for providing illumination.

Another object of the present invention is to provide an outdoors umbrella which comprises a solar power supply arrangement for providing an independent, environmentally-friendly and economical power source to the outdoors umbrella.

Another object of the present invention is to provide an outdoor umbrella which comprises a solar power supply arrangement and a lighting system, wherein the solar energy supply arrangement can store solar energy during daytime when the umbrella is in normal operation, and deliver electrical energy to the lighting system during nighttime or in a fairly dark environment. In other words, no intentional charging process is required when the umbrella is not in use.

Another object of the present invention is to provide an outdoors umbrella which comprises a solar power supply arrangement and a lighting system, wherein the solar power supply can be selectively switched to provide power to the lighting system for activate the lighting system, or to only storing solar energy for reserving power for future use.

Another object of the present invention is to provide an outdoors umbrella incorporated with a solar power supply arrangement and a lighting system which do not significantly alter the original structure of the outdoors umbrella, so as to minimize the manufacturing and marketing costs of the outdoors umbrella.

Another object of the present invention is to provide an outdoors umbrella incorporated with a solar power supply arrangement and a lighting system, wherein no complicated mechanical and electrical process are involved in installing and mounting the solar power supply arrangement and the lighting system on the outdoors umbrella.

Accordingly, in order to accomplish the above objects, the present invention provides an outdoors umbrella, comprising:

an umbrella awning;

an umbrella frame, which comprises:

a main supporting stem; and a foldable awning frame which is supported by said main supporting stem, and comprises an upper housing supported by said main supporting frame, and a plurality of awning supporting arms outwardly and radially extended from said upper housing to support said umbrella awning and to define a shielding zone thereunder;

a lighting system which comprises at least one illuminating units mounted on said umbrella frame for providing illumination substantially on said shielding zone; and a solar power supply arrangement which comprises a solar collecting device having a collecting surface arranged to expose in sunlight for collecting solar energy, wherein said solar collecting device is electrically connected to said lighting system, and adapted to convert said solar energy into electrical energy, so as to provide said electrical energy to said lighting system.

DETAILED DESCRIPTION OF THE PREFERRED EMBODIMENT

Figure 1:
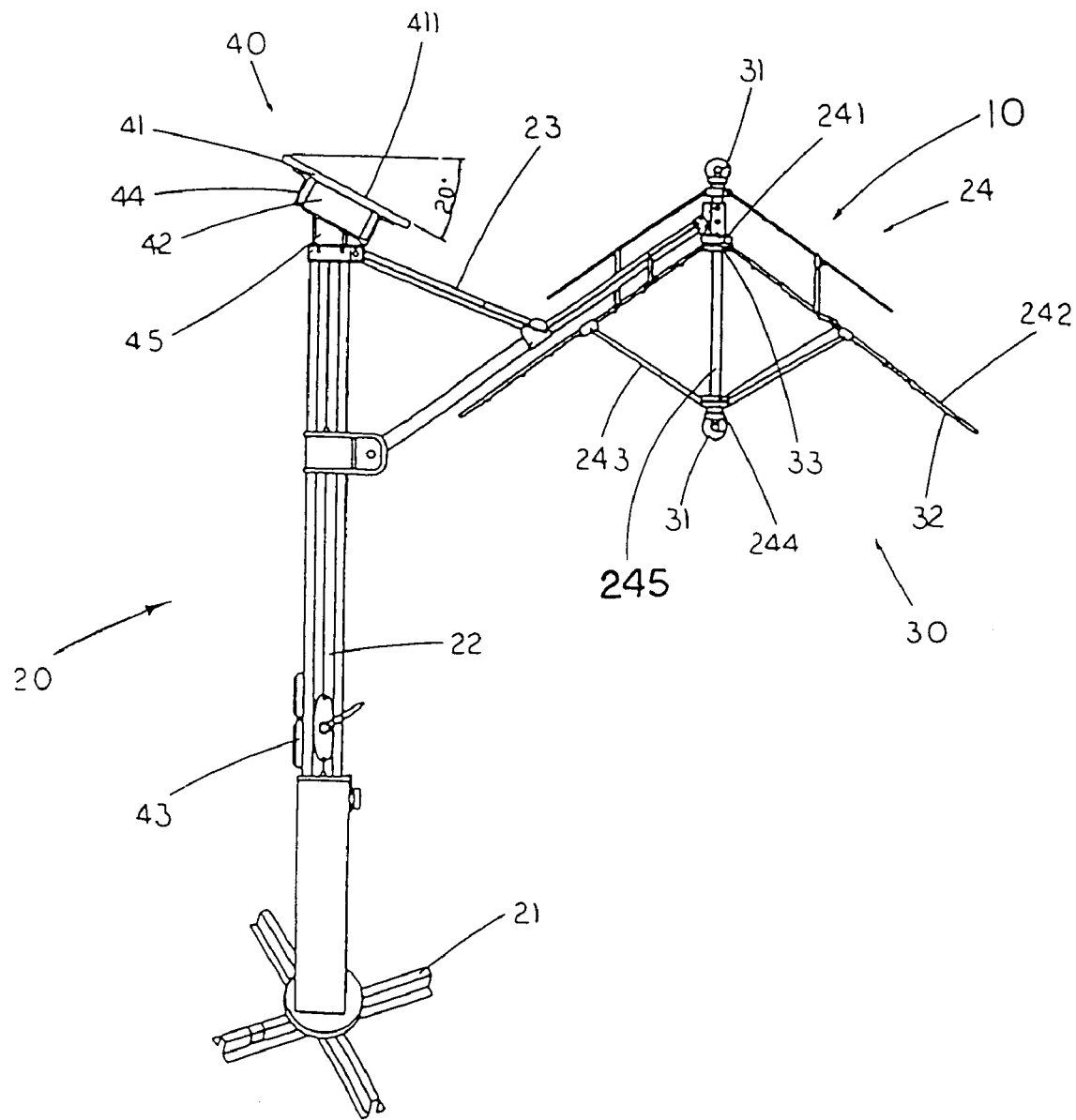
FIG. 1 is a perspective view of an outdoors umbrella according to a first preferred embodiment of the present invention.
Figure 2A:
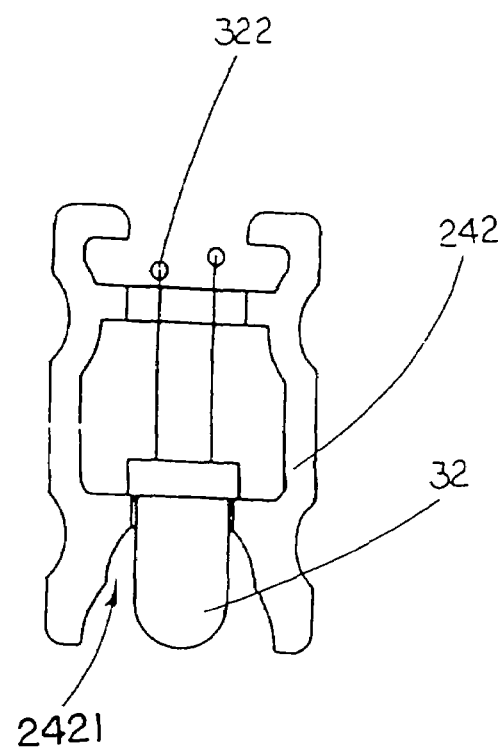
FIGS. 2A, 2B are schematic views of the electrical connection of the illuminating devices according to the above first preferred embodiment of the present invention.
Figure 2B:
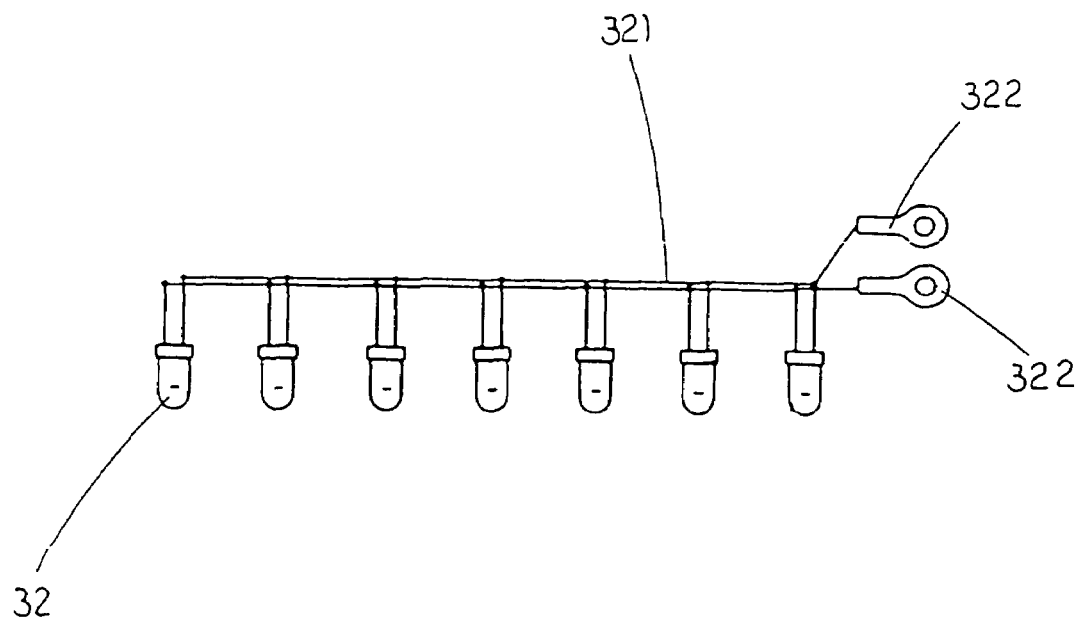

Referring to FIG. 1 of the drawings, an outdoor umbrella 1 according to a first preferred embodiment of the present invention is illustrated. According to the first preferred embodiment, the outdoor umbrella 1 comprises a foldable umbrella awning 10, an umbrella frame 20 which supports the umbrella awning 10, a lighting system 30 mounted on the umbrella frame 20, and a solar power supply arrangement 40 which converts solar energy into electrical energy and provides the converted electrical energy to the lighting system 30 for lighting up the lighting system 30.

The umbrella frame 20 comprises a base 21, a main supporting stem 22 vertically mounted on top of the base 21, a connecting arm 23 sidewardly extended from a top portion of the main supporting stem 22 in a pivotally movable manner, and an foldable awning frame 24 slidably mounted on the connecting arm 23. The awning frame 24 comprises an upper housing 241 and a plurality of awning supporting arms 242 outwardly and radially extended from the upper housing 241 in such a manner that they are adapted to move between a folded position and an unfolded position, wherein in the folded position, the awning supporting arms 242 are pivotally and inwardly folded to overlappedly lay in position, wherein in the unfolded position, the awning supporting arms 242 are pivotally and outwardly extended to support the umbrella awning 10 thereon and to define a shielding zone under the awning supporting arms 242.

The awning frame 24 further comprises a pair of lower connecting ears 243 each having a first end slidably mounted on the awning supporting arms 242, and a second end mounted on a lower housing 244 provided below the upper housing 241. Preferably, the awning frame 24 further comprises an elongated longitudinal member 245 downwardly extended from the upper housing 241 to the lower housing 244 for further strengthening the awning frame 24.

The lighting system 30 comprises at least a central lighting element 31 and a plurality of illuminating units 32 mounted on the awning frame 24 for primarily providing illumination to the shielding zone of defined by the plurality of awning supporting arms 242. According to the first preferred embodiment, the central lighting elements 31 are regular light bulbs mounted on the lower housing 244 for providing strong illumination at a central portion of the shielding zone. The plurality of illuminating units 32 are Light Emitting Diodes (LEDs) mounted on the plurality of awning supporting arms 242 respectively for providing mild illumination for the shielding zone.

Referring to FIGS. 1 to 2A and 2B of the drawings, the plurality of illuminating units 32 are tubular and electrically connected with each other by electrical wires 321, wherein the electrical wires 321 are extended along an interior of awning supporting arms 242 to form two connecting tips 322 arranged to electrically connect with the solar power supply system 40. Hence, when the connecting tips 322 are applied with a predetermined potential difference, i.e. a certain voltage, the illuminating units 32 will be lit up accordingly. Furthermore, the lighting system 30 further comprises an electric hub 33 mounted on the upper housing 241 wherein the connecting tips 322 is securely received inside the electric hub 33. Accordingly, the awning supporting arms 242 each has of light receiving slot 2421 formed thereon respectively wherein the illuminating units 32 are securely mounted on the light receiving slot.

The solar power supply arrangement 40 comprises a solar collecting device 41 supported by a top portion of the main supporting stem 22, wherein the solar collecting device 41 has a collecting surface 411 arranged to face towards sunlight so that it can be exposed to sunlight for extensively collecting solar energy. Moreover, the solar collecting device 41 is adapted to collect solar energy from sunlight impinged on the collecting surface 411, and converts the collected solar energy into electrical energy, wherein the connecting tips 32 received inside the electric hub 33 and the central lighting element 31 are electrically connected with the solar collecting device 41 so that the converted electrical energy is supplied to the lighting system 30.

Figure 3:
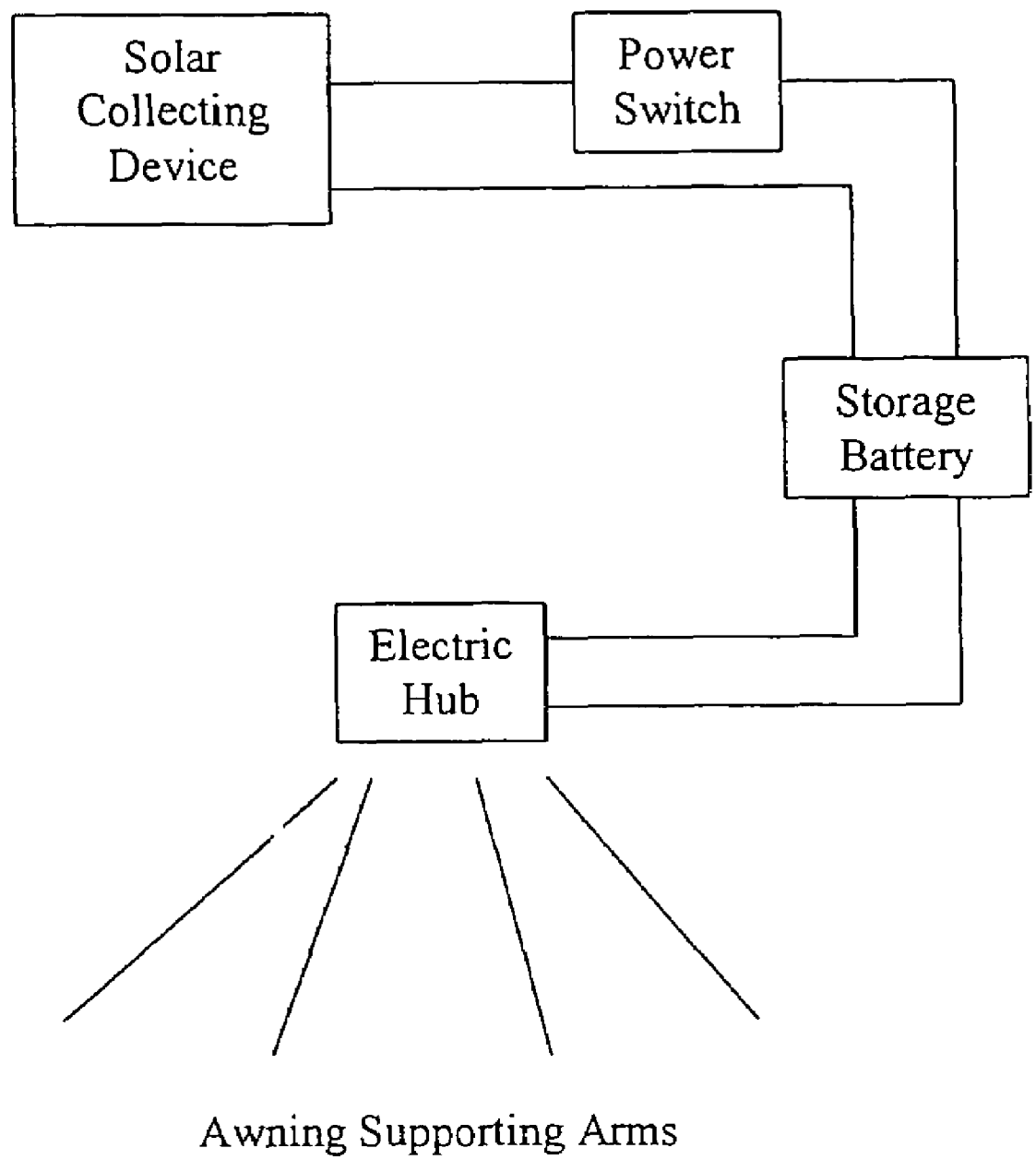
FIG. 3 is a schematic view of the electrical connection between the solar collecting device, the storage battery and the illuminating units according to the above first preferred embodiment of the present invention.
Figure 4:
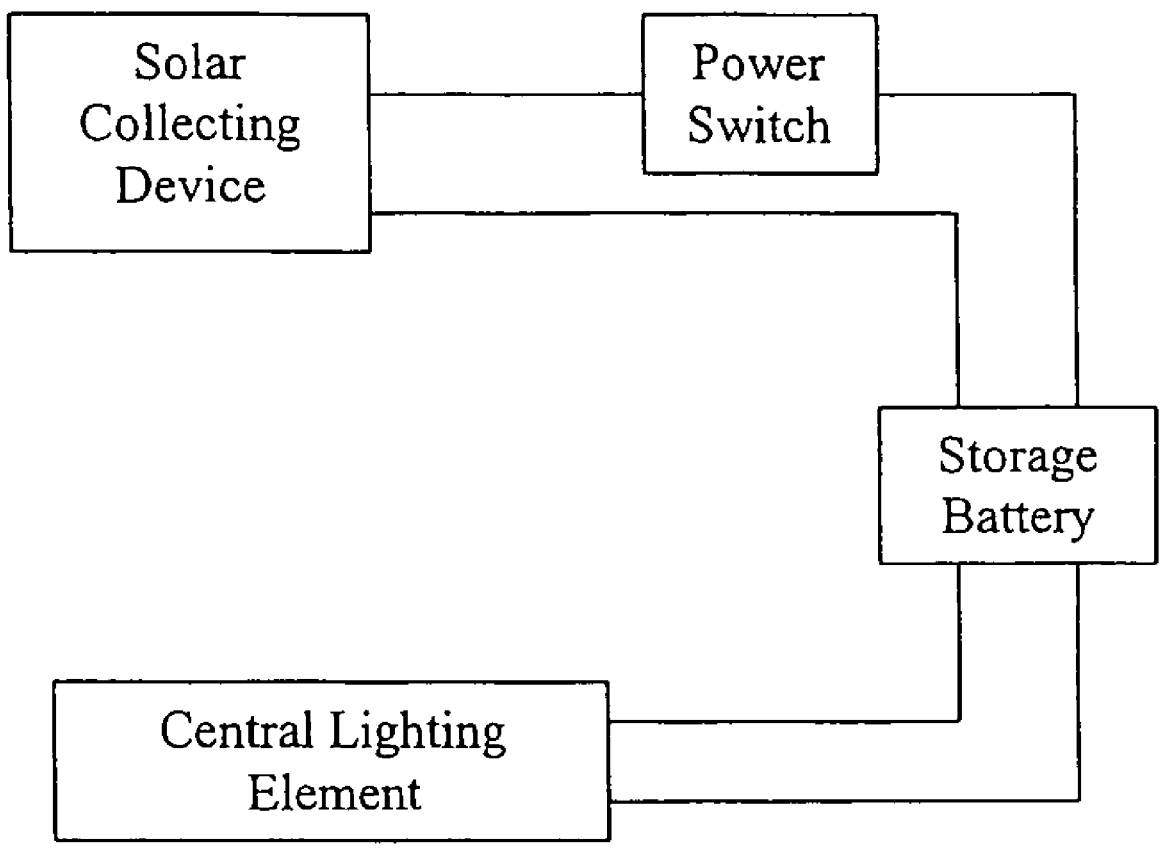
FIG. 4 is a schematic view of the electrical connection between the solar collecting device, the storage battery and the central lighting element according to the above first preferred embodiment of the present invention.

Referring to FIGS. 1, 3 to 4 of the drawings, the solar power arrangement 40 further comprises a storage battery 42 electrically connected to the solar collecting device 41 via a power switch 43 mounted on the main supporting stem 22, wherein the power switch 43 is arranged to selectively connect and disconnect the solar collecting device 43 with the storage battery 42. In other words, when the power switch is turned off, the solar collecting device stops from providing electricity to the storage battery 42, whereas when the power switch 43 is turned on, the solar collecting device 41 is arranged to deliver electricity to the storage battery 42 for storing electricity converted from solar energy.

Then, the user of the outdoors umbrella 1 can prevent the storage battery 42 from being continuously charged by turning off the power switch 43 so as to maximize the lift span of the storage battery 42. When the umbrella 1 is in use and sunlight is available, the user can simply turn on the power switch 43 for charging up the storage battery 42 so as to store electricity for the lighting arrangement 30 when sunlight is not available. As a result, the user can charge up the storage battery 42 even though the outdoor umbrella 1 is in use. No intentional charging process is required to perform by the user when the outdoors umbrella 1 is idle.

It is important to mention that, according to the first preferred embodiment of the present invention, the storage battery 42 is incorporated with an electronic circuit that stops the battery 42 from further charging if the storage battery 42 is fully charged, conversely, the electronic circuit will allow the storage battery 42 to be charged by the solar collecting device 41 if the storage battery 42 is not fully charged. Of course, one ordinary skilled in the art would appreciate, without violating the very spirit of the present invention, that the electronic circuit can be incorporated with the storage battery 42 as in the case of the first preferred embodiment, or it can be electrically connected to the storage battery 42 in order to prevent the storage battery 42 from being overcharged or having inadequate electricity.

Furthermore, a lighting switch can be incorporated with the power switch for the user to selectively turn on and turn off the illuminating units 32 and the central lighting element 31. For example, when the outdoors umbrella 1 is used during daytime, the user may not want to light up the illuminating units 32 and the central lighting element 31, but yet want to charge up the storage battery 42 to reverse electricity for use during nighttime. Then the user can simply turn off the lighting system 30 but turn on the power switch to allow charging of the storage battery 42.

The solar power supply arrangement 40 further comprises a battery housing 44 having a receiving cavity provided therein, and a battery base 45, wherein the storage battery 42 is arranged to receive inside the storage cavity, and that the solar collecting device 41 is mounted on top of the battery housing 44. Then, the battery housing 44 is mounted, preferably in pivotally movable manner, on the battery base 45 which is further mounted on top of the main supporting stem 22. Note that the battery housing 44 is mounted on the battery base 45 in a pivotally movable manner so that it is adapted to move in an orientation which maximize solar energy adsorption of the solar collecting device 41 mounted on top of the battery housing 44. In other words, the user can be able to adjust the orientation of the collecting surface 411 in order to maximize the solar absorption of the solar collecting device 41. Of course, the battery housing 44 can also be firmly mounted on the battery base 44 with no movable part. For example, referring to FIG. 1 of the drawings, the collecting surface can be mounted at an angle of 20 degrees with respect to horizontal so as to maximize the solar absorbing efficiency of the solar collecting device.

Figure 5:
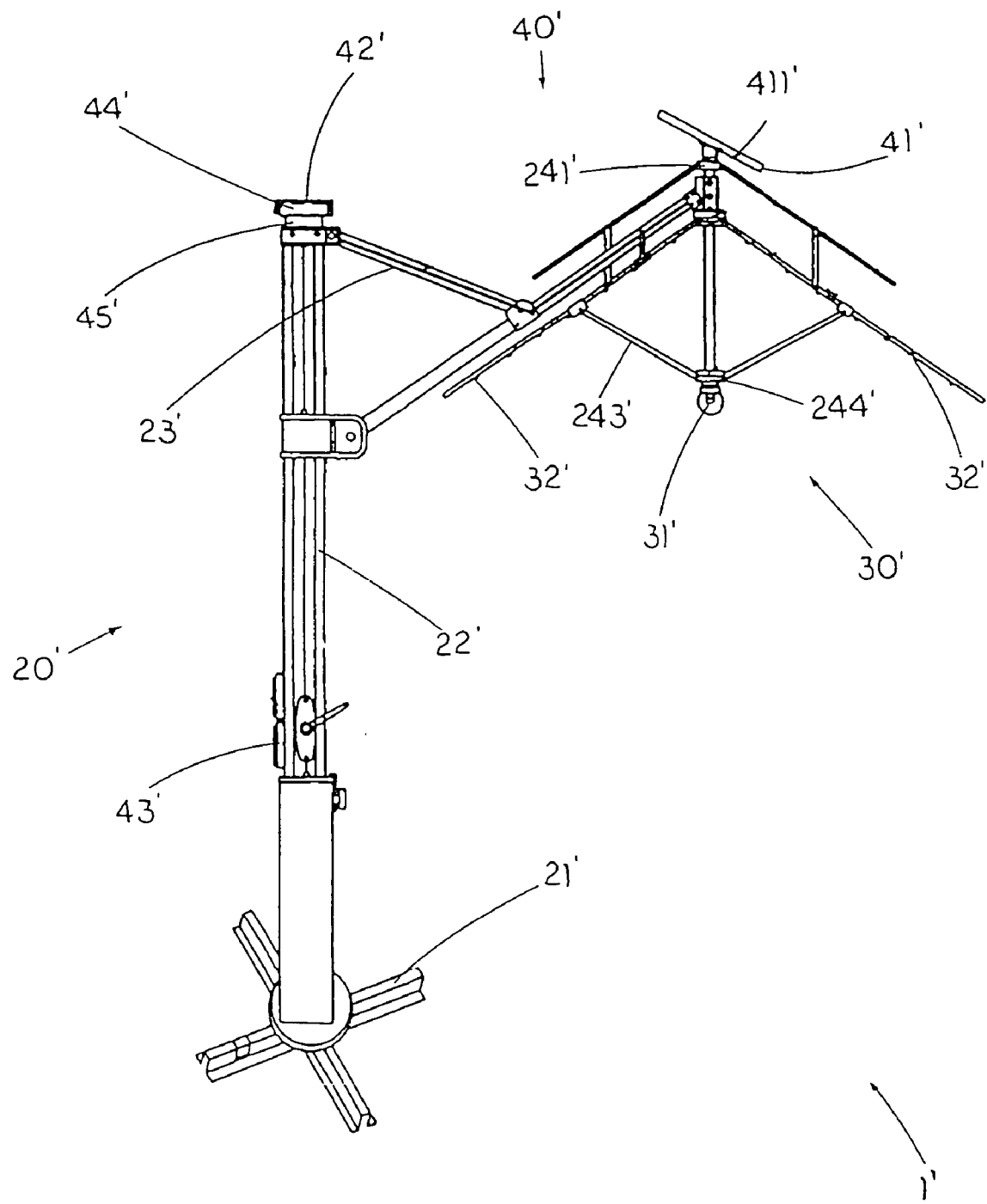
FIG. 5 illustrates a first alternative mode of the outdoors umbrella according to the above first preferred embodiment of the present invention.

Referring to FIG. 5 of the drawings, a first alternative mode of the solar power supply arrangement 40' according to the first preferred embodiment of the present invention is illustrated. According to the alternative mode, the solar collecting device is mounted on top of the upper housing 241' of the awning frame 24', whereas the storage battery 42' is arranged to receive inside the storage cavity of the battery housing 44', and that the battery housing 44' on the battery base 45' is further mounted on top of the main supporting stem 22. The solar collecting device 41' is electrically connected with the storage battery 42' along the awning supporting arms 242' and the main supporting stem 22'. As in the case of the first preferred embodiment, the solar collecting device 41' can be movably mounted on top of the upper housing 241' so that the user of the outdoors umbrella 1' can be able to adjust its orientation for maximizing the absorption of solar energy.

Figure 6:
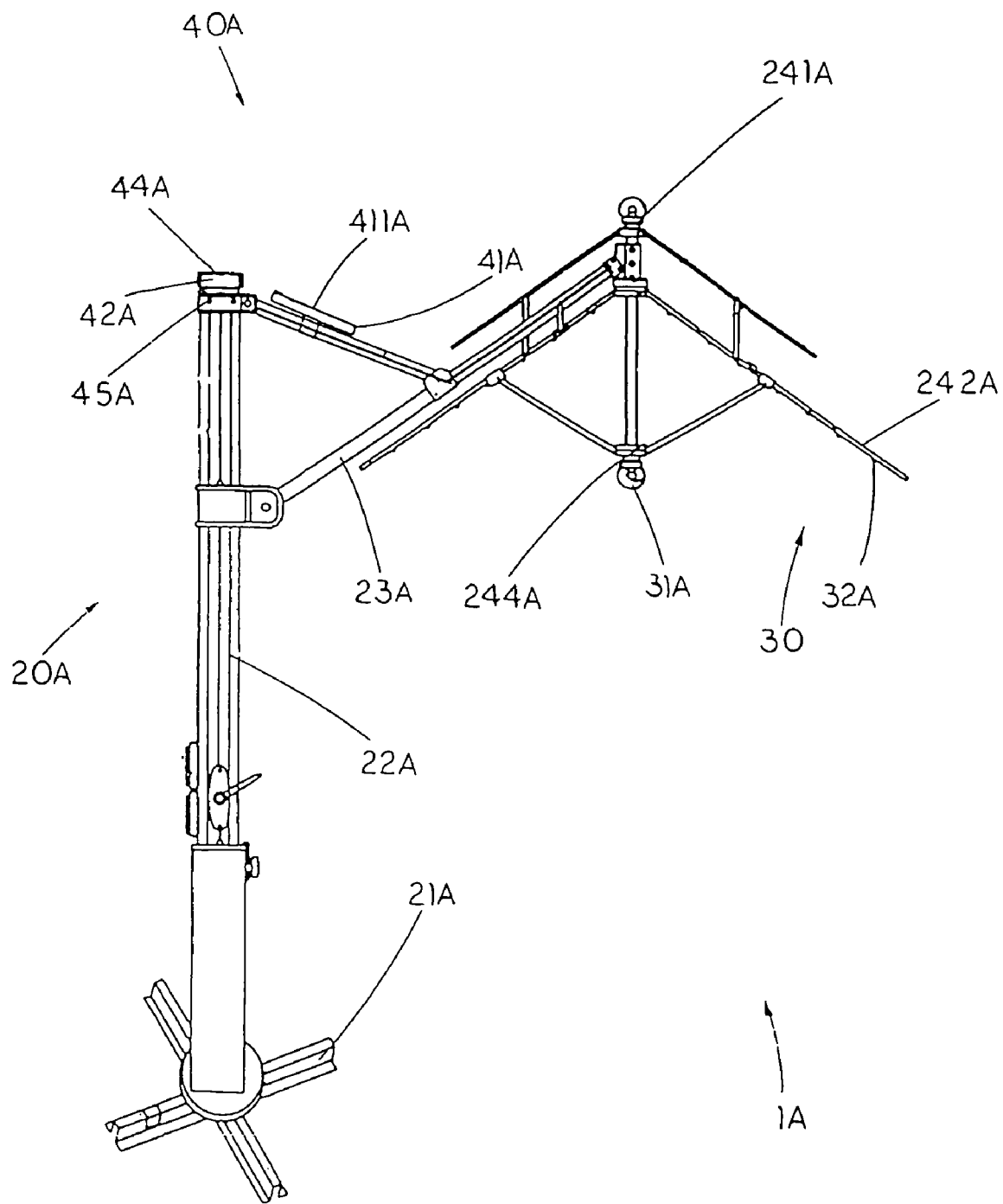
FIG. 6 illustrates a second alternative mode of the outdoors umbrella according to the above first preferred embodiment of the present invention.
Figure 7A:
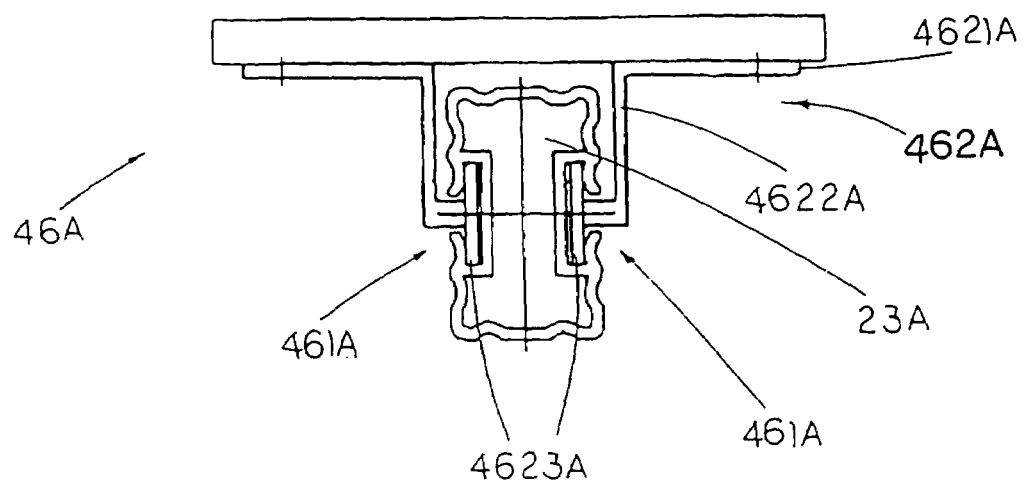
FIG. 7A illustrates an alternative mode of a mounting arrangement of the outdoors umbrella according to the above first preferred embodiment of the present invention.

Furthermore, as an second alternative of the above first preferred embodiment, the solar power supply arrangement 40A further comprises a mounting arrangement 46A, wherein the mounting arrangement 46A contains two longitudinal mounting slots 461A, having T-shaped cross section, formed on two sides of the upper connecting arm 23A, and comprises a mounting device 462A comprising a supporting panel 4621A mounted the solar collecting device 41A, a pair of retaining members 4622A downwardly extended from a bottom surface of the supporting panel 4621A, and two T-shaped sliding guiders 4623A inwardly extended from the bottom ends of the retaining members 4622A respectively, wherein the T-shaped sliding guiders 4623A are arranged to slidably and fittedly inserted into the mounting slots 461A so as to mount the solar collecting device 41A on the connecting arm 23A. Accordingly, the distance between the two retaining members 4622A must be larger than a width of the connecting arm 23A so that the sliding guiders 4623A can be inserted into the mounting slots 461A so as to mount the solar collecting device 41A on the connecting arm 23A. The storage battery 42A is mounted on top of the main supporting stem 22A via the battery base 45A and electrically connected to the solar collecting device 41A in the same manner as the first alternative mode as described above, as shown in FIG. 6 to 7A of the drawings.

Figure 7B:
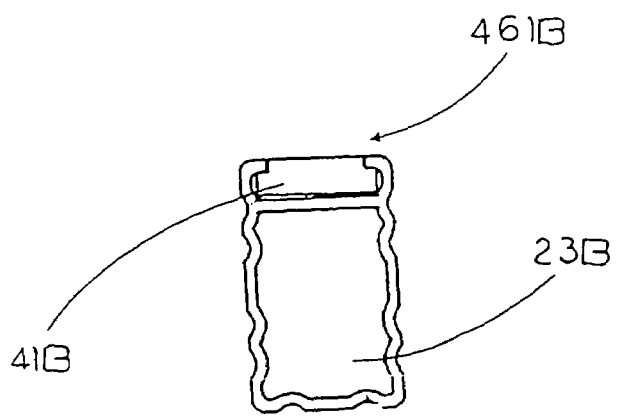
FIG. 7B illustrates another alternative mode of the mounting arrangement of the outdoors umbrella according to the above first preferred embodiment of the present invention.

Alternatively, referring to FIG. 7B of the drawings, the mounting arrangement 46B comprises a mounting slot 461B formed on the upper connecting arm 23B, wherein the solar collecting device 41B is arranged to fittedly and slidably insert into the mounting slot 461B so as to mount the solar collecting device 41B on the upper connecting arm 23B.

Figure 8:
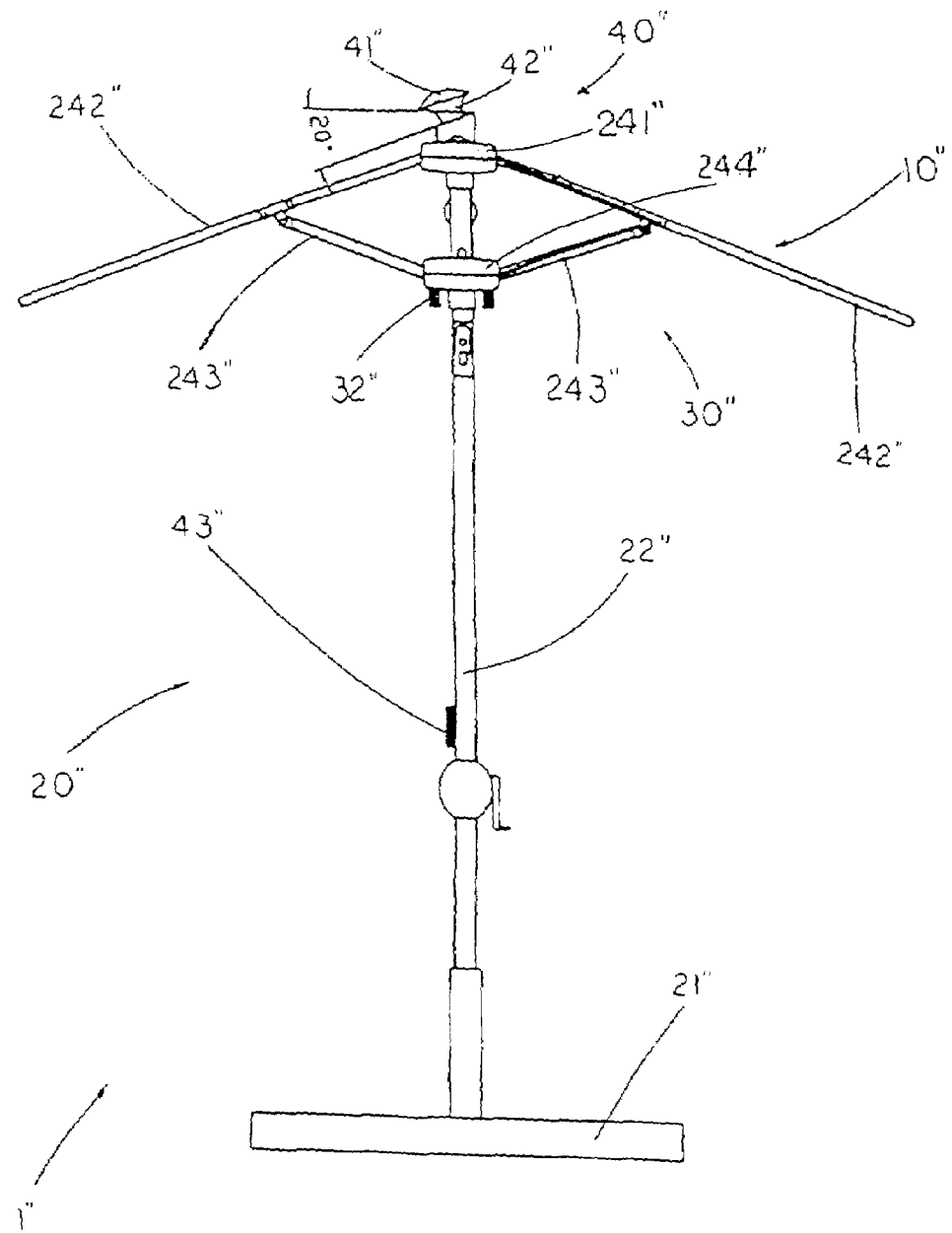
FIG. 8 is a perspective view of an outdoors umbrella according to a second preferred embodiment of the present invention.

Referring to FIG. 8 of the drawings, an outdoors umbrella 1" according to a second preferred embodiment of the present invention is illustrated. According to the second preferred embodiment, the outdoors umbrella 1" comprises an umbrella awning 10", an umbrella frame 20", a lighting system 30" and a solar power supply arrangement 40".

The umbrella frame 20" comprises a base 21", a main supporting stem 22" vertically mounted on top of the base 21" and upwardly extended therefrom, and an foldable awning frame 24" slidably mounted on the main supporting stem 22". The awning frame 24" comprises an upper housing 241" mounted on top of the main supporting stem 22", and a plurality of awning supporting arms 242" outwardly and radially extended from the upper housing 241" in such a manner that they are adapted to move between a folded position and an unfolded position, wherein in the folded position, the awning supporting arms 242" are pivotally and inwardly folded to overlappedly lay in position, wherein in the unfolded position, the awning supporting arms 242" are pivotally and outwardly extended to support the umbrella awning 10" thereon and to define a shielding zone under the awning supporting arms 242".

The awning frame 24" further comprises a pair of lower connecting bars 243" each having a first end slidably mounted on the awning supporting arms 242", and a second end mounted on a lower housing 244" provided below the upper housing 241", wherein the lower housing 244" is slidably mounted on the main supporting stem 22".

The lighting system 30" comprises a ring-shaped illuminating unit 32" mounted on the lower housing 244", preferably via a connecting base, for primarily providing illumination to the shielding zone of defined by the plurality of awning supporting arms 242". According to the first preferred embodiment, the illuminating unit 32" can be a ring-shape fluorescent lamp mounted on bottom portion of the lower housing 244". Alternatively, the illuminating unit 32" can also be a ring-shaped Light Emitting Diode (LED) or even a plurality of LEDs arranged in a ring shape.

The solar power supply arrangement 40" comprises a solar collecting device 41" supported by a top portion of the main supporting stem 22", wherein the solar collecting device 41" has a collecting surface 411" arranged to face towards sunlight so that it can be exposed to sunlight for extensively collecting solar energy. Moreover, the solar collecting device 41" is adapted to collect solar energy from sunlight impinged on the collecting surface 411", and converts the collected solar energy into electrical energy, wherein illuminating unit 32" is electrically connected with the solar collecting device 41" so that the converted electrical energy is supplied to the lighting system 30".

The solar power arrangement 40" further comprises a storage battery 42" electrically connected to the solar collecting device 41" via a power switch 43" mounted on the main supporting stem 22", wherein the power switch 43" is arranged to selectively connect and disconnect the solar collecting device 43" with the storage battery 42". In other words, when the power switch is turned off, the solar collecting device stops from providing electricity to the storage battery 42", whereas when the power switch 43" is turned on, the solar collecting device 41" is arranged to deliver electricity to the storage battery 42" for storing electricity converted from solar energy.

It is important to mention that can be incorporated with an electronic circuit that stops the storage battery 42" from further charging if the storage battery 42" is fully charged, and conversely, the electronic circuit will allow the storage battery 42" to be charged by the solar collecting device 41" if the storage battery 42" is not fully charged. Furthermore, a lighting switch can be incorporated with the power switch for the user to selectively turn on and turn off the illuminating unit 32".

The solar power supply arrangement 40" further comprises a battery housing 44" having a receiving cavity provided therein, wherein the storage battery 42" is arranged to receive inside the storage cavity, and that the solar collecting device 41" is mounted on top of the battery housing 44". The battery housing 44" is then mounted, preferably in pivotally movable manner, on top of the upper housing 241". As in the case of the first preferred embodiment, the collecting surface 411" is mounted on the upper housing in such a manner that it makes an angle of twenty degrees with respect to horizontal.

In view of the above, the present invention substantially provides an outdoor umbrella 1 which utilizes an environmentally friendly, rather unlimited, and independent source of energy to operate its lighting system 30. The feature of independent source of energy is rather important since the user of the outdoors umbrella 1 no longer needs to use lengthy electrical wires for providing electricity to the lighting system 30. Furthermore, the user doesn't need to pre-charge the battery when the umbrella is not in use.

What is claimed is:

1. An outdoor umbrella, comprising:
   an umbrella awning;
   an umbrella frame comprising a main supporting stem, an awning frame supporting said umbrella awning to define a shielding zone under said umbrella awning, and a connecting arm pivotally extended from a top portion of said main supporting stem to said awning frame to substantially support said awning frame, wherein said connecting arm has two longitudinal mounting slots at two sides thereof;
   a lighting system which comprises one or more illuminating units mounted on said awning frame for providing illumination to said shielding zone; and
   a solar power supply arrangement comprising a solar collecting device having a collecting surface mounted on said umbrella frame at a position above said shielding zone for exposing in sunlight to collect solar energy, wherein said solar collecting device is electrically connected to said lighting system for converting said solar energy into electrical energy so as to provide said electrical energy to said lighting system, wherein said solar collecting device comprises two sliding guiders extended downwardly to be slidably mounted along said two mounting slots of said connecting arm to securely mount said solar collecting device along said connecting arm that said collecting surface of said solar collecting device is inclinedly orientated for facing towards sunlight to collect said solar energy.

2. The outdoor umbrella, as recited in claim 1, wherein said solar power supply arrangement further comprises a storage battery electrically connected between said lighting system and said solar collecting device, wherein said storage battery is adapted for storing said electrical energy converted by said solar collecting device to supply said electrical energy to said lighting system.

3. The outdoors umbrella, as recited in claim 2, wherein said solar power supply arrangement further comprises a power switch electrically connected said storage battery with said solar collecting device, so as to selectively connect and disconnect said solar collecting device with said storage battery to control an electrical charging of said storage battery.

4. The outdoors umbrella, as recited in claim 1, wherein said awning frame comprises an upper housing supported by said main supporting stem and a plurality of awning supporting arms outwardly and radially extended from said upper housing.

5. The outdoors umbrella, as recited in claim 4, wherein said lighting system further comprises a plurality of electrical wires extended along said awning supporting arms respectively to electrically connect to said illumination units such that said illumination units are spacedly aligned along said awning supporting arms for providing illumination to said shielding zone.

6. The outdoors umbrella, as recited in claim 5, wherein each of said awning supporting arms has a light receiving slot formed along a bottom side thereof to receive said respective electrical wire such that said illumination units are spacedly embedded in said awning supporting arms within said light receiving slots thereof.

7. The outdoors umbrella, as recited in claim 6, wherein said awning supporting arms are pivotally connected to said awning frame in such a manner that said awning supporting arms are adapted to move between a folded position and an unfolded position, wherein at said folded position, said awning supporting arms are pivotally and inwardly folded to overlappedly lay in position, and at said unfolded position, said awning supporting arms are pivotally and outwardly extended to maximize said shielding zone under said umbrella awning.

8. The outdoors umbrella, as recited in claim 5, wherein said awning supporting arms are pivotally connected to said awning frame in such a manner that said awning supporting arms are adapted to move between a folded position and an unfolded position, wherein at said folded position, said awning supporting arms are pivotally and inwardly folded to overlappedly lay in position, and at said unfolded position, said awning supporting arms are pivotally and outwardly extended to maximize said shielding zone under said umbrella awning.

* * * * *